United States Patent [19]
Hanser et al.

[11] Patent Number: 5,547,040
[45] Date of Patent: Aug. 20, 1996

[54] AUTOMATIC STEP FOR RECREATIONAL VEHICLES

[75] Inventors: Paul E. Hanser; Daniel J. Boddicker, both of Tipton, Iowa; John F. Blake, Preemption, Ill.

[73] Assignee: HWH Corporation, Moscow, Iowa

[21] Appl. No.: 532,296

[22] Filed: Sep. 22, 1995

Related U.S. Application Data

[63] Continuation of Ser. No. 267,338, Jun. 28, 1994, abandoned.

[51] Int. Cl.[6] ...................................................... B60R 3/02
[52] U.S. Cl. .............................. 182/88; 182/96; 182/127; 280/166
[58] Field of Search ................................ 182/88, 127, 97, 182/96; 280/166

[56] References Cited

U.S. PATENT DOCUMENTS

| | | | |
|---|---|---|---|
| 3,403,926 | 10/1968 | Way et al. | 280/166 |
| 4,185,849 | 1/1980 | Jaeger | 280/166 |
| 4,188,889 | 2/1980 | Favrel | 105/455 |
| 4,623,160 | 11/1986 | Trudell | 280/166 |
| 5,085,450 | 2/1992 | DeHart, Sr. | 280/166 |

FOREIGN PATENT DOCUMENTS 58-39543A  3/1983  Japan.

*Primary Examiner*—Alvin C. Chin-Shue
*Attorney, Agent, or Firm*—Henderson & Strum

[57] ABSTRACT

An automatic entryway step system for recreational vehicles and motor homes which extends and retracts a step in response to a momentary push button switch located inside the vehicle near the door. A safety retraction system automatically retracts the step when the vehicle ignition is turned on, but only if the vehicle parking brake is not engaged. If the vehicle ignition system is turned on while the parking brake is engaged, a step warning indicator will be activated to alert the driver that the step is extended. If the parking brake is released, the step will retract and the warning indicator will be turned off.

3 Claims, 2 Drawing Sheets

AUTOMATIC STEP FOR RECREATIONAL VEHICLES

This is a continuation of application Ser. No. 08/267,338 filed on Jun. 28, 1994 abandoned.

TECHNICAL FIELD

This invention relates to automatic entryway step systems for recreational vehicles and motor homes.

BACKGROUND ART

Automatic step systems for recreational vehicles, motor homes, and the like are well known in the art. These systems, typically electrically controlled and electrically actuated, extend and retract an entryway step in response to a signal provided by an individual wishing to enter or exit the vehicle. One common system extends the step when the vehicle door is opened, and then retracts the step when the vehicle door is closed. Other systems offer a switch located just inside the vehicle door which controls the extension and retraction of the step. These systems also include a master power switch which can be used to lock the step in a given position. A common safety feature of such systems provides for automatic retraction of the step when the vehicle ignition system is turned on, thus preventing inadvertently moving the vehicle while the step is extended. This system is unsatisfactory in that there are many times when it is desirable to have the vehicle engine running with the step extended, such as occasions when vehicle engine electrical power or air conditioning is needed.

DISCLOSURE OF THE INVENTION

The present invention discloses an automatic entryway step system for recreational vehicles and motor homes which extends and retracts a step in response to a momentary push button switch located inside the vehicle near the door. A safety retraction system automatically retracts the step when the vehicle ignition is turned on, but only if the vehicle parking brake is not engaged. If the vehicle ignition system is turned on while the parking brake is engaged, a step warning indicator will be activated to alert the driver that the step is extended. If the parking brake is released, the step will retract and the warning indicator will be turned off.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
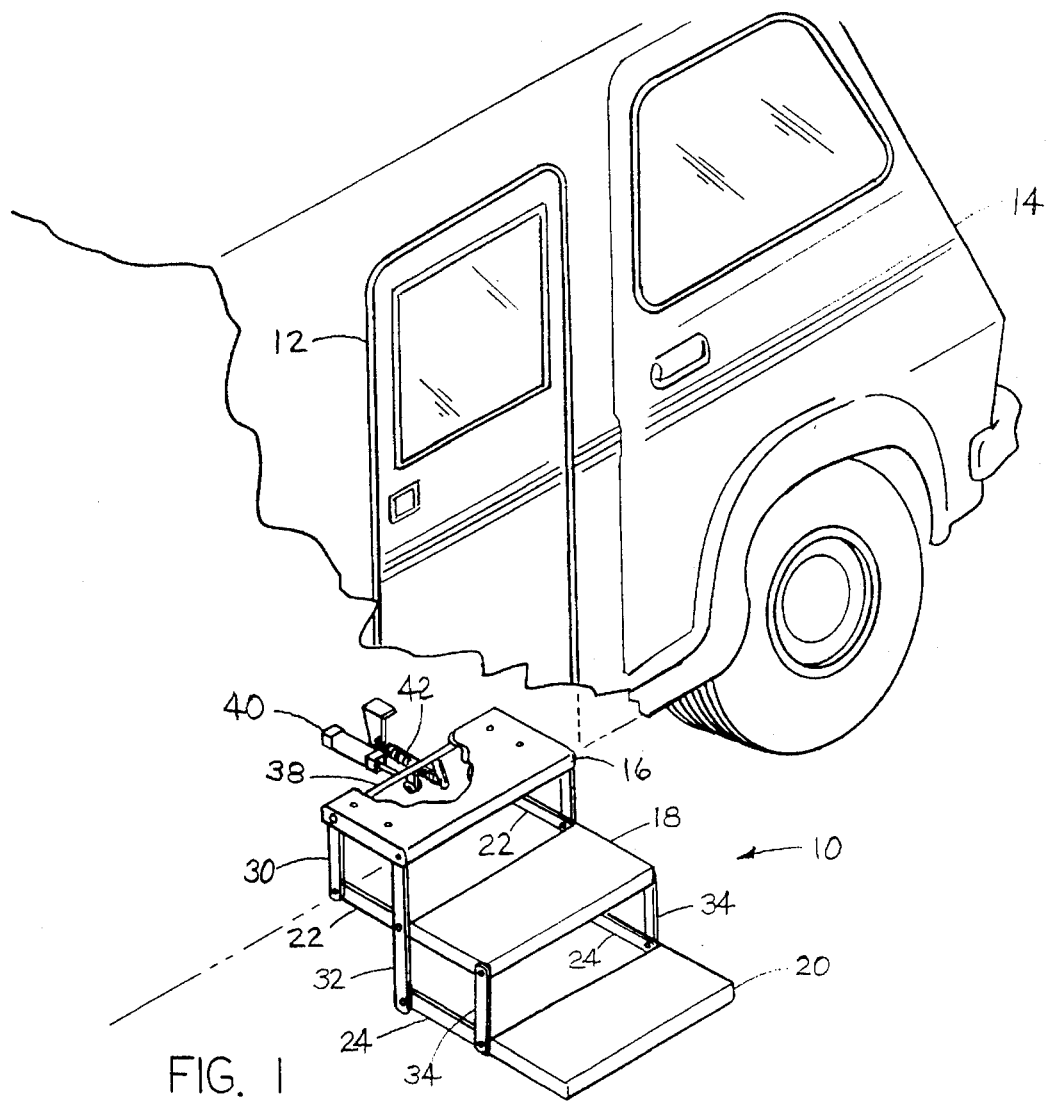
FIG. 1 is a perspective view of the invention installed on a recreational vehicle.
Figure 2:
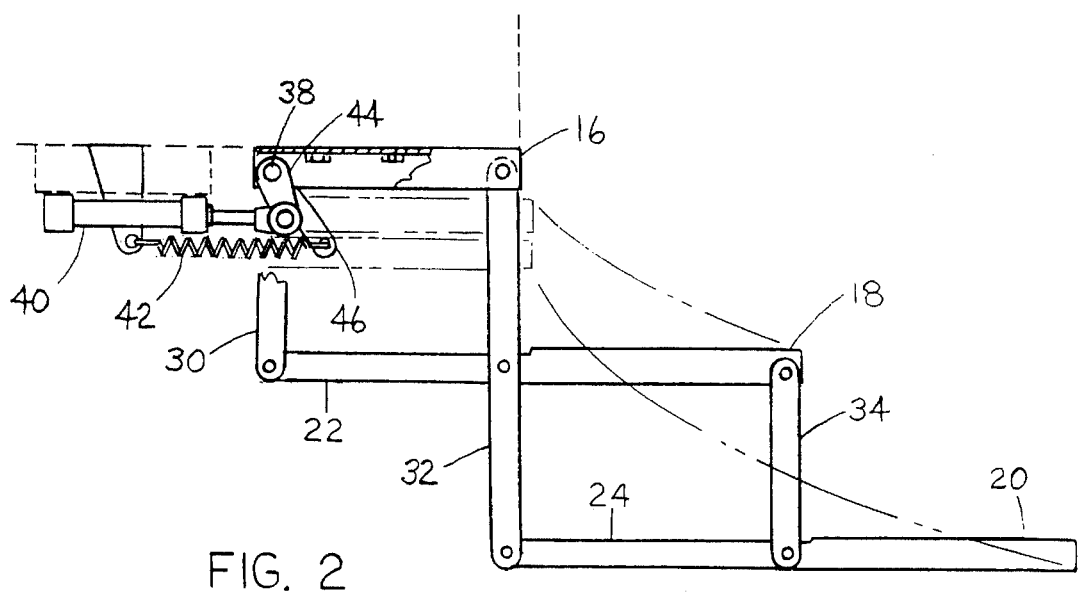
FIG. 2 is a side elevation view of the invention, partially cutaway.

Referring now to FIGS. 1 and 2, the invention is depicted generally at 10 where it is shown in the extended position secured adjacent an entryway door 12 of a recreational vehicle 14. Extendable and retractable steps as utilized in the present invention are known in the art and are generally comprised of a base 16 and a pair of steps 18, 20. A pair of horizontal arms 22, 24 are secured to each of the steps 18, 20 to support them in the horizontal position. The horizontal arms 22, 24 are in turn pivotally attached to pivot arms 30, 32, 34. In the depicted embodiment, pivot arms 30, 32 are pivotally secured to the base 16. The two inner pivot arms 30 are rigidly connected together by means of a pivot rod 38. It should therefore be understood that as the pivot rod 38 is rotated in a counter-clockwise direction, the pivot arms 30, 32, 34 will be driven to a vertical position, rotating the steps 18, 20 to the extended position. As pivot rod 38 is rotated in a clockwise direction, the pivot arms 30, 32, 34 will be rotated inward to a horizontal position, rotating the steps 18, 20 to the retracted position.

The step actuator of the preferred embodiment is comprised of a hydraulic cylinder 40 and a spring 42, each of which is secured at one end to the vehicle and secured at the opposite end to its respective pivot bracket 44, 46, which in turn is affixed to the pivot rod 38. As hydraulic pressure is applied to the cylinder 40, the step will extend. When hydraulic pressure is relieved from the cylinder 40, the spring 42 will withdraw the step into the retracted position.

Figures 3, 4:
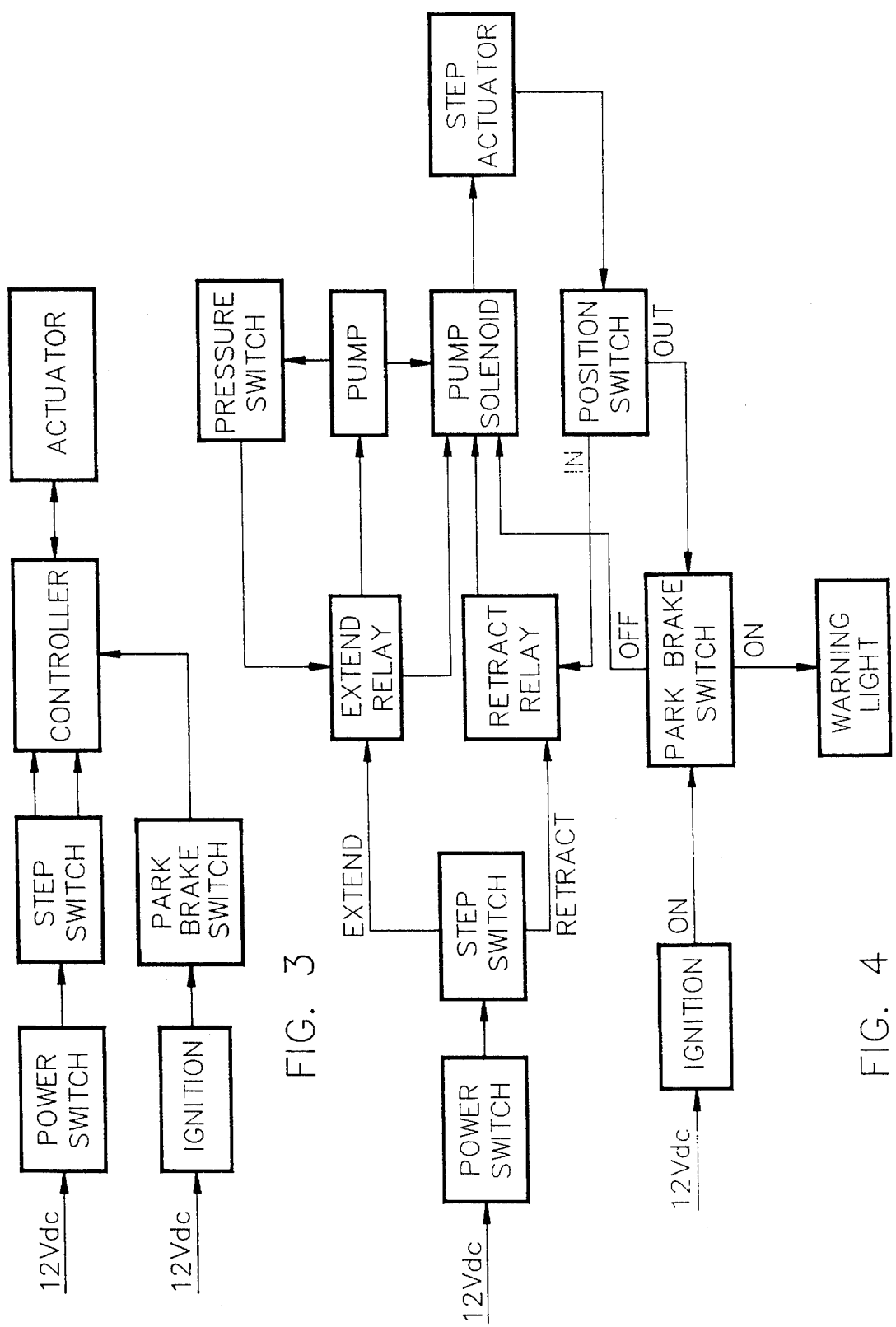
FIG. 3 is a block diagram of a general embodiment of the invention.
FIG. 4 is a block diagram of a preferred embodiment of the invention.

The functioning of the invention will be described with reference to FIG. 3 and FIG. 4, in which FIG. 3 is a block diagram of a generic automatic step system of the present invention and FIG. 4 is a block diagram of a preferred embodiment. The apparatus receives 12 volts dc from the vehicle electrical system through a master power switch which is used to power the system and lock the step in a given position. The step position is controlled by means of a momentary step switch which may be attached to the vehicle entryway door so as to extend and retract the step when the door is opened and closed, or positioned just inside the doorway for manual activation. In the preferred embodiment, momentarily positioning the step switch to the extend position activates an extend relay, which turns on the hydraulic pump and activates the pump solenoid, transferring hydraulic fluid to a hydraulic cylinder which pivots the step into the extend position as previously described. When the step reaches the extended position, an increase in pump pressure activates a pressure switch which then deactivates the extend relay, shutting off power to the pump and pump solenoid. Momentarily positioning the step switch to the retract position activates the retract relay, which activates the pump solenoid so as to relieve hydraulic pressure within the hydraulic cylinder. A spring then withdraws the step into the retracted position as previously described. When the step reaches the fully retracted position, a position switch deactivates the retract relay, shutting off power to the pump solenoid.

The retraction system may also receive power from the vehicle ignition system when the ignition system is turned on. If the step is in the extended position as indicated by the step position switch, and if the vehicle parking brake is off, 12 volts dc from the ignition system will be applied to the pump solenoid and step retraction will be initiated as described previously. However, if the vehicle parking brake is engaged, the step will remain extended while a warning light is turned on to warn the driver of the step position. If the parking brake is then disengaged, the step will immediately retract and the warning light will extinguish.

Obviously, many modifications and variations of the present invention are possible in light of the above teachings. For instance, it would be obvious to one skilled in the art to utilize purely hydraulic or electric actuators for the step extension and retraction mechanism. It is therefore to be understood that, within the scope of the appended claims, the invention may be practiced otherwise than as specifically described herein.

What is claimed is:

1. An automatic step extension and retraction system for recreational vehicles, comprising:

(a) an extendable and retractable entryway step;

(b) an extension system comprising a control switch operably connected to and activating an extend relay, said extend relay operably connected to a hydraulic pump and a pump solenoid which provide hydraulic fluid to a hydraulic extension cylinder affixed between said vehicle and said step, and further including a pressure switch engaged and actuated by the full extension of said step and operably connected to said extend relay whereby said extend relay is deactivated when said step is extended; and (c) a retraction system comprising said control switch operably connected to and activating a retract relay, said retract relay operably connected to said pump solenoid, and a retraction spring affixed between said vehicle and said step.

2. The invention as recited in claim 1, and further comprising a step position switch operably connected between said step and said retract relay, whereby said retract relay is deactivated when said step is retracted.

3. The invention as recited in claim 2, and further comprising a secondary retraction system including a parking brake switch operably connected between a vehicle ignition switch and said pump solenoid.

\* \* \* \* \*